Nov. 27, 1956

C. F. BALL 2,771,958

HYDRAULIC DRIVE WITH PRESSURE EQUALIZER
AND CONTROL FOR PLURAL MOTORS

Filed Dec. 7, 1953

Inventor:
Charles F. Ball.
by Faris A. Maxson
attorney.

Nov. 27, 1956
C. F. BALL
2,771,958
HYDRAULIC DRIVE WITH PRESSURE EQUALIZER
AND CONTROL FOR PLURAL MOTORS
Filed Dec. 7, 1953
2 Sheets-Sheet 2
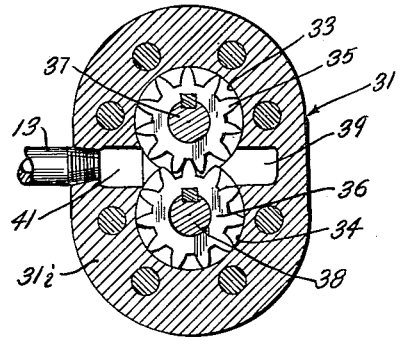
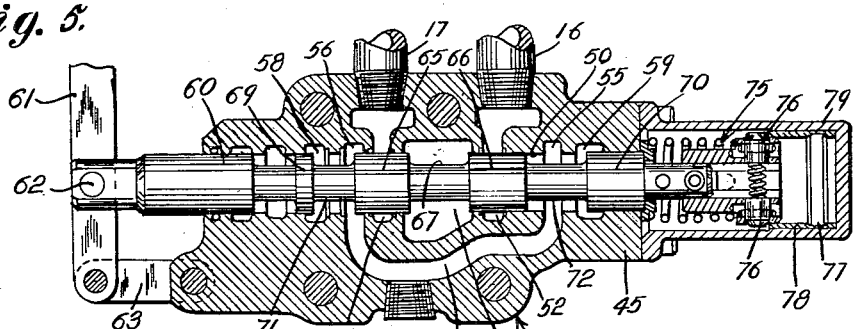
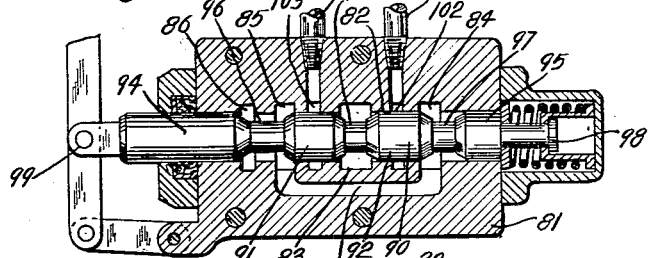
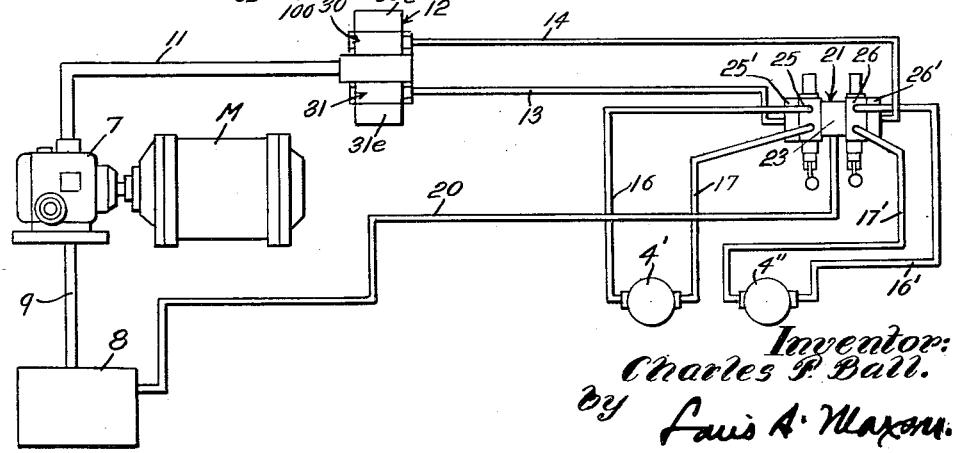
Inventor:
Charles F. Ball.
By Louis A. Maxson.
Attorney.

United States Patent Office 2,771,958
Patented Nov. 27, 1956

2,771,958

HYDRAULIC DRIVE WITH PRESSURE EQUALIZER AND CONTROL FOR PLURAL MOTORS

Charles F. Ball, Franklin, Pa., assignor to Joy Manufacturing Company, Pittsburgh, Pa., a corporation of Pennsylvania Application December 7, 1953, Serial No. 396,508

6 Claims. (Cl. 180—6.48)

This invention relates particularly to propulsion and steering mechanisms for vehicles—whether track-laying tread mounted or wheel mounted—in which steering is accomplished by stopping, retarding movement of, or reversely driving the ground-engaging supporting and propulsion mechanism at one side while the corresponding mechanism at the other side is being driven. Nothing in the foregoing is to be understood as limiting the improved drive to such particular mechanisms, and its adaptability to and use in other twin or double drives where it is applicable is contemplated.

In hydraulically driven track-laying tread supported vehicles, to describe in general terms one preferred embodiment of the invention, a ready control of speed—a very important consideration in certain mining apparatus—is practicable by varying the quantity of fluid delivered to the motor drives of the separate treads. If each tread has a hydraulic driving motor individual to it, control by the use of conventional reversing valves associated one with each of such motors provides for starting, stopping, speed control and reversing, but does not make easy the coordinate control of the treads and uniform speed of drive at the opposite sides of the apparatus. To provide proper distribution of the fluid to the two motors, and also to aid in steering, I propose, according to my invention, to provide a hydraulic equalizer between the motors and the source of fluid under pressure, and preferably to locate it between the fluid source and the reversing valves. Desirably the reversing valves will be of a type which permits selectively interruption of fluid supply to the motor which it controls or fluid supply to such motor to effect its rotation in either direction, with locking of the motor against rotation or with relatively free rotation of the motor in either direction when fluid supply is cut off.

A hydraulic equalizer—a flow divider, as such devices are sometimes called—consists of a fluid metering device comprising housing means providing a plurality of non-communicating fluid chambers, means in each of said chambers defining therewith a hydraulic motor-pump device of predetermined displacement, means connecting said motor-pump devices for operation in unison, passage means for supplying fluid to each of said motor-pump devices, and outlet connections individual to said motor-pump devices for delivering fluid to pressure fluid operable instrumentalities or to vent. It will be understood that the housing means providing the non-communicating fluid chambers may be entirely separate from each other, or a unitary structure, and that the essential feature is that there shall be a plurality of motor-pump devices so connected that neither can operate without the other and having a common source of supply and independent discharges.

For the purposes of the present application, the displacements of the motor-pump devices will desirably be the same. When both motor-pump devices are connected to vent, or when each of the fluid operable instrumentalities to which the outlet connections of said motor-pump devices require the same volumes of fluid at the same pressure to effect their operation, the motor-pump devices operate neither as motors nor as pumps. They (the motor-pump devices) absorb some power, but in effect float in the moving stream of fluid. If the fluid in the discharge connection of either motor-pump device is at a pressure less than that in the discharge connection for the other, the first will act as a motor and the second will act as a booster pump, and the pressure in the outlet or discharge connection from the device acting as a booster pump will be higher than in the passage means which supplies fluid to each of the motor-pump devices. From this, it will be evident that, dependent upon the pressures in the individual discharge connections for the motor-pump devices, either may act as a motor, or either may act as a booster pump, and the function which either may perform may vary automatically with the changes in the operating conditions of the pressure fluid operable instrumentalities to which fluid under pressure is delivered from the discharge connections of said motor-pump devices. For example, if the loads were equal on the pressure fluid operable instrumentalities to which the two motor-pump devices were delivering fluid, each of the motor-pump devices would in effect merely float. If the load on one were disconnected and the discharge of that one vented freely, it (that one) would act forthwith as a motor imparting torque to the other; and, if the load on the other had been increased by virtue of the cessation of drive by the pressure fluid operable instrumentality whose supply was via the first motor-pump device, as might occur where the loads were drives to tractor treads, the power available to the tractor tread still connected for drive would be substantially augmented by virtue of the booster pump action of the motor-pump device through which fluid passed to the pressure fluid operable instrumentality connected to that tread. It will also be appreciated that if the pressure fluid operable instrumentalities were reversible motors, one could be driven in one direction, and the other in the other direction and, provided the loads which they drove were equal though opposite, the motor-pump devices would distribute equal quantities to the two pressure fluid operable instrumentalities.

Present experience appears to warrant the expectation that the boosting effect derived from the free venting of the discharge of one motor-pump device and its resultant action wholly as a motor may be expected to effect a boosting of the pressure entering the other motor-pump device by on the order of at least 60 to 65%. An interesting point is that, assuming a certain pressure per square inch was required by the pressure fluid operable instrumentalities when the loads on them were the same, the venting of one could make available at the discharge of the other considerably higher pressure per square inch, but if the remaining load required less than the maximum available higher pressure per square inch to handle it, the supply pressure to the motor-pump devices would fall off to a value substantially below that which had previously been available at the discharges of both motor-pump devices.

With an arrangement which results from the combination of a source of fluid under pressure, a flow divider the motor-pump devices of which are of equal displacement and which have their exhausts connected one to one tread propulsion motor and the other to the other tread propulsion motor, which tread propulsion motors are of like displacements, and with valve devices between the respective exhausts of the motor-pump devices of the flow divider and the fluid supply connections to the reversible tread driving motors providing for drive of said motors in either direction, locking of said tread driving motors against rotation or free rotation of said tread driving motors, a most desirable propulsion mechanism is formed particularly if the source of fluid supply is a variable displacement pump.

For tramming straight ahead or back the equalizer or divider would more or less float, causing some resistance but insuring an even split of the fluid. If one tread driving motor has its drive interrupted by venting back to the tank the fluid which would normally drive it, there would be substantially no resistance in that part of the circuit beyond the motor-pump device of the flow divider whose exhaust is vented to the tank. Thereupon the motor-pump device whose discharge was vented would act as a driving motor, instead of primarily as a metering device, and its power would tend to boost the pressure transmitted through the other motor-pump device of the flow divider. Thus more power would be available to the tread driving motor which continued to drive a tread, and thus a most beneficial result would be obtained, as it normally takes considerably more power to drive one tread when steering than to drive either tread when traveling straight ahead or back. It will of course be understood that the flow divider would not act as a booster if both tracks are driven at like rates even though one might be driven forward while the other is driven in reverse.

From the forgoing it will be apparent that it is a primary object of my invention to provide an improved driving and control apparatus, and a more specific object to provide an improved driving and control apparatus or system for a vehicle whose propulsion and steering are effected by the control of individual driving motors for the supporting and propulsion devices at the opposite sides of the vehicle. Other objects and advantages will appear hereinafter.

In the accompanying drawings, in which a preferred embodiment and a modification are shown for purposes of illustration:

Fig. 4 is a further section on the plane of the line 4—4 of Fig. 3;

Fig. 5 is a central section through a preferred form of controlling valve for a tread driving motor;

Fig. 6 is a central section through a modified form of controlling valve for such a motor;

Fig. 7 is a diagrammatic view showing a hydraulic system.

Figure 1:
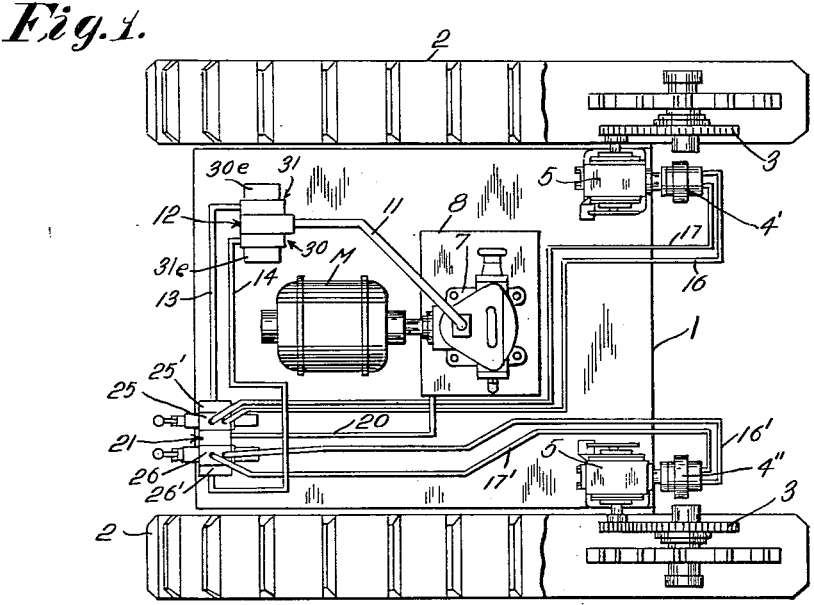
Fig. 1 is a plan view of a track laying tread supported vehicle, with parts broken away to show details, in which vehicle there is somewhat diagrammatically shown a propulsion and control system incorporating the invention.

Referring to Fig. 1, there may be noted a vehicle body 1, supported by suitable track laying mechanisms 2, the treads of which are driven by sprocket drives 3 by power supplied by reversible hydraulic motors 4' and 4" of any suitable construction connected through further reduction gearing represented by casings 5 in which it is housed. This further gearing may be either of the self-locking type or such as to permit free turning when the motors 4' and 4" have their fluid connections both connected to vent, though nonself-locking gearing is deemed preferable for most purposes. Any suitable motor M, may be mounted on the body 1, and it serves as driving means for a hydraulic pump 7, but may also serve as a power source for other purposes. The pump 7 is desirably of a suitable variable displacement type and is shown mounted on a tank 8 for hydraulic fluid, from which tank it draws fluid through an intake line 9, and the pump 7 discharges fluid through a discharge conduit 11 to a flow divider 12, later more fully described, in which the fluid which it receives through the conduit 11 is divided between two conduits 13 and 14, the division of fluid between these conduits being a substantially equal one in the particular construction now being considered.

The motor 4' has two fluid conduits connected to it, these being designated 16 and 17. Fluid supply through the conduit 16 drives the motor 4' in one direction, and as the motor is rotated in that direction the fluid supplied to it through the conduit 16 is vented through the conduit 17. Conversely the motor 4' may be driven in the opposite direction by supplying fluid through the conduit 17 and permitting its discharge through the conduit 16. The motor 4" is also provided with two fluid connections, namely, the conduits 16' and 17' and reverse operation of the motor 4" is possible in a manner similar to that described with respect to the motor 4'. A connection for the return of fluid to the reservoir 8 is shown at 20 and this connection leads from a valve box structure 21 which is really a completely separate double valve box arrangement except for the fact that there is a commonly housed double exhaust box 23 common to the two control valve structures 25 and 26 that make up the valve box structure. The conduit 13 leads to a box section 25' which, as is quite common with such valve box structures, may be provided with a suitably set relief valve controlling the flow of fluid so that when a predetermined pressure is reached fluid is exhausted from the conduit 13 to the return conduit 20. In like manner the supply box 26' may be provided with a pressure responsive relief valve controlled connection leading from the conduit 14 to the return conduit 20.

Figure 2:
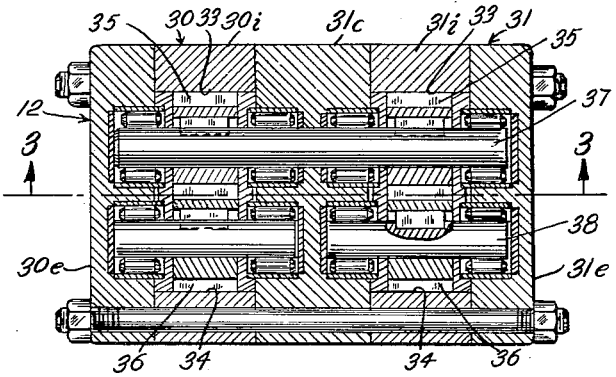
Fig. 2 is a central section through a flow divider or pressure equalizer, the section being taken on a plane which includes the axes of the rotors which with a casing form the motors of the flow divider.
Figure 3:
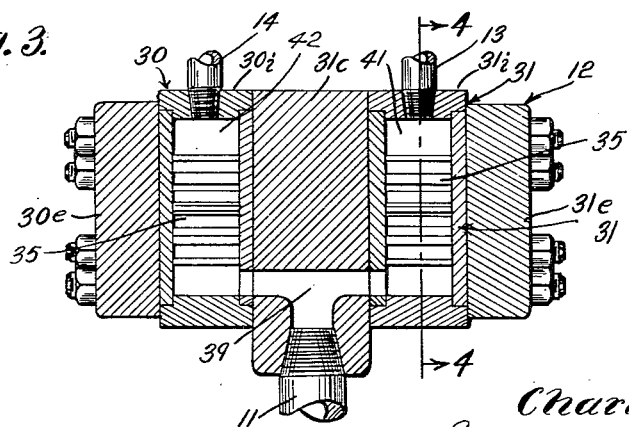
Fig. 3 is a central longitudinal section on the plane of the line 3—3 of Fig. 2.

Before going into the detailed structure of the valve devices 25 and 26 to any greater extent, it may be well to describe the pressure equalizer or flow divider 12. As illustrated, this comprises in effect a pair of gear type motor-pump devices having a rotor of one motor-pump device connected for turning at equiangular rate with the corresponding rotor of the other motor-pump device. The two motor-pump devices are designated generally 30 and 31. They comprise individual end sections 30e and 31e, individual intermediate rotor chamber sections 30i and 31i, and a common central end section 31c. In the intermediate setcions 30i and 31i there are provided intersecting, generally cylindrical bores 33 and 34 (see Fig. 4) in which rotors of the spur gear type 35 and 36 are supported for rotation. The rotors 35 are mounted on and keyed to a common shaft 37. The rotors 36 are individually journalled on shafts 38. The shafts are suitably journalled, and suitable end seals are provided for the rotor chambers but as this type of structure is conventional it need not be described in detail through it may be noted in Fig. 2. The fluid supply conduit 11 opens into a chamber 39 which extends longitudinally of the casing of the flow divider and communicates with the portions of the chambers 33 and 34 of both motor-pump devices at one side of a plane in which the rotor axes lie. The portions of the rotor chambers 33 and 34 at the opposite side of the plane in which the rotor axes lie have individual chambers 41 and 42 which have connected with them the conduits 13 and 14. It will thus be seen that fluid led to the flow divider 12 by way of the conduit 11 is carried around in the tooth pockets of the rotors 35 and 36 and since the two pairs of rotors 35—36 are essentially identical, there is a substantially even division of the fluid supplied through the conduit 11 between the conduits 13 and 14—this regardless of whether or not like pressures exist in the conduits 13—14 and whether or not the pressures are high or low in these conduits.

If the pressure received from the variable displacement pump is below that required to drive one of the treads when the other isn't being driveen, the motor-pump device of the flow divider which has its discharge vented back to the tank will act as a motor and cause the other motor-pump device to act as a booster pump taking in fluid at an elevated pressure and discharging it at a higher pressure.

It will thus be noted that it is possible to have a substantially equal supply of fluid to the conduits 13 and 14, when each is discharging to one of the motors 4'—4", and it is possible, even though one of the conduits 13—14 may be freely vented, as later explained, back to the reservoir 8, still to continue to supply substantially the same volume of fluid through the other conduit as would flow thereto if both conduits were under pressure. During operation, when one of the conduits 13—14 is vented and the other is supplying fluid to one of the motors 4'—4", the motor-pump device of the flow divider 12 which has its discharge connected freely back to the source of fluid will augment the pressure in the other of the conduits 13—14 by adding a positive torque through the shaft 37 to the other of the motor-pump devices, which will thus be caused to augment or "boost" the pressure of the fluid which enters its supply side.

Control valve devices 25 and 26 may now be noted but first it might be pointed out that the structure of these devices which is shown in Fig. 5 may be replaced if desired by the simpler conventional control valve structure of Fig. 6.

Referring now to Fig. 5, it will be noted that the valve mechanism 25 includes a casing 45 which has communicating with it conduits 16 and 17. Within the casing 45 there is a valve receiving bore 50 of considerable length and which is surrounded by a number of annular or generally annular grooves. With this bore there communicate at opposite sides of its center annular grooves 51 and 52 which are connected respectively with the conduits 17 and 16. Between these annular grooves is another larger (wider) annular groove 53 which constitutes an exhaust groove and which is in communication through a passage, not shown, with the return conduit 20. To the outside of the annular grooves 51 and 52 there are further annular grooves 55 and 56 and these are connected by a generally U-shaped passage 57 with which the supply connection 13 communicates through the box 25' in a well-known manner. Further to the outside, and nearer the ends of the valve casing 45, are grooves 58 and 59 the first of which is connected, as is the groove 53, with the return conduit 20, and the second of which is not. Other connections will later be described. The groove-surrounded bore 50 has reciprocable in it a valve 60 which is adapted to be shifted in opposite directions by lever mechanism 61 pivotally connected at 62 with the valve 60 and supported at its lower end pivotally upon a pivotally supported link 63. The valve 60 has a number of spools or heads: an intermediate pair 65 and 66 spaced by a groove 67 and normally, in the position of the valve shown in Fig. 5, shutting off from communication both with supply and exhaust, the conduits 16 and 17. Outside the heads 65 and 66 are further heads 69 and 70, these being spaced by grooves 71 and 72 from the heads 65 and 66 respectively. At the right end of the valve as shown in Fig. 5 there is a conventional mechanism for the accomplishment of two functions, this mechanism being generally designated 75. In the first place, it automatically returns the valve 60 to central position when the lever 61 is released—this irrespective of the previous direction of displacement of the valve 60 from mid-position, provided the valve is not thrown all the way to the right. The other function is through spring pressed detents 76—76 to hold the valve yieldingly in its extreme right-hand position when these detents enter a groove 77 in a sleeve 78 secured in a housing 79 carried at the right-hand end of the casing 45.

When the motor M is driving the pump 7, fluid will be supplied continuously to conduits 13 and 14 in substantially equal volumes. The fluid so supplied may drive both motors 4' and 4". It may drive neither of the motors and be vented back freely to the reservoir 8 when the valve 60 is in the position of Fig. 5, and at that time the motors 4' and 4" will both be locked. When the valve 60 is displaced to extreme right-hand position, the fluid discharged—say through the conduit 13—may pass freely back to the reservoir through the groove 58, and the conduits 16 and 17 will be connected with each other because the conduit 16 will communicate with the exhaust groove 53 through the groove 67 while the conduit 17 will communicate with the groove 53 through the groove 71. Thus, the two sides of the motor will be connected with each other and with exhaust.

It will be noted that in the position of the parts shown in Fig. 5 fluid is sealed in both of the motors 4' and 4" and so simply by leaving the valve 60 in mid-position either motor 4' or 4" may be locked with resultant locking of the "cat" tread. If fluid is supplied to one of the motors 4'—4" while it is vented from the other, the motor receiving fluid will receive it under a higher pressure due to the booster action previously described. If the valve 60 is in its extreme right-hand position, it is possible to have the fluid vented from one of the conduits 13—14 while not having the motor which is adapted to receive fluid from this conduit locked at all.

To summarize, if the valve 60 is in the position shown in Fig. 5 the conduits 16 and 17 are both closed but free discharge of fluid supplied through the conduit 13 via the passage 57 can take place. When 16 is supplied with fluid while 17 is connected to exhaust or when 17 is supplied with fluid and 16 is connected to exhaust, the motor 4' will be operated in one direction or the other. If conduits 16 and 17 are connected together as may be done by moving the valve 60 all the way to the right free discharge of the fluid coming from the conduit 13 will take place, but the tread operated by the motor 4' will not be locked.

If fluid is supplied to one of the motors 4' or 4" while the fluid supply to the other is freely vented, more power will be applied by the motor supplied with fluid, as the flow divider will then act to impose extra pressure as above explained on the fluid passing to the working motor. Of course either motor can be locked, and so lock its tread, or be connected to leave its tread free to move, in either case with extra driving power for the other tread. Tread locking is effected with the valve 60 in the position of Fig. 5, tread release when the valve 60 is pushed all the way to the right in Fig. 5.

It is not necessary to repeat in further great detail the mode of operation of this mechanism since it has been pointed out that through the provision of the flow divider 12 as shown and described there cannot be, except when both valve mechanisms 25 and 26 are being controlled to permit free discharge of fluid back to the reservoir, a return of the fluid supplied by the pump 7 to the reservoir without having a substantial pressure maintained in one of the conduits 13—14.

In Fig. 6 a conventional type of control valve is illustrated which permits fluid to be supplied through an associated line 13—14 to effect tread motor drive in either direction or locking of both tread motors while the fluid supplied through the line 13 or 14 is freely vented. This mechanism does not provide for concurrent free venting of the fluid supplied through a conduit such as 13 or 14 and simultaneous free connection between the opposite sides of the motor 4' or 4" which is controlled. The valve block 81 has a bore 82 which is surrounded by four grooves, a central one 83, two similarly located grooves 84—85 at opposite sides of the central groove 83 and a further groove 86 adjacent to the groove 85 but still more remote from the center of the valve bore 82. In the bore is reciprocable a valve member 90 having a pair of heads 91 and 92 spaced by a groove 93. Outside the heads 91—92 are other heads 94 and 95 spaced from the heads 91 and 92 respectively by grooves 96 and 97. An automatic valve centering device of conventional form is shown at 98 and valve operating mechanism at 99. The grooves 83 and 86 are both connected to the return line 20. The grooves 84 and 85 are connected by a U-shaped passage 100 with which one of the conduits 13 or 14 communicates. The conduits 16 and 17 communicate with annular grooves 102 and 103 which lie between the grooves 84 and 83 and 85 and 83 respectively. Obviously by moving the valve 90 to the right fluid can be supplied to the conduit 17 while the conduit 16 is vented. By moving the valve to the left conduit 16 can be supplied with fluid and conduit 17 vented. In the position of the parts shown in Fig. 6 the mouths of conduits 16 and 17 are sealed but fluid flows freely from the passage 100 to exhaust through the grooves 85, 96 and 86 and the return line 20. Thus this arrangement when duplicated for the motors 4' and 4" can provide for concurrent drive by their motors in the same direction, concurrent drive in opposite directions, and drive of either with augmented power while the other is locked against rotation.

Any further detailed description of the mode of operation of the different illustrative embodiments is unnecessary, in view of the very full descriptions in earlier parts of this specification.

While there are in this application specifically described two forms which the invention may assume in practice, it will be understood that these forms of the same are shown for purposes of illustration and that the invention may be modified and embodied in various other forms without departing from its spirit or the scope of the appended claims.

What is claimed is:

1. In combination, a pair of ground-engaging vehicle-supporting and propelling elements, a reversible hydraulic driving motor individual to one of said elements, a reversible hydraulic driving motor individual to the other of said elements, a power operated pump, a flow divider comprising a pair of motor-pump devices connected to turn together and each having a fluid discharge, fluid supply connections between said pump and said pair of motor-pump devices comprised by said flow divider, a fluid supply connection leading from one of said fluid discharges, a fluid supply connection leading from the other of said discharges, a control valve to which one of said fluid supply connections leads, a control valve to which the other of said fluid supply connection leads, a pair of alternatively fluid supply and fluid exhaust connections leading from one of said control valves to one of said reversible hydraulic driving motors and a pair of alternatively fluid supply and exhaust connections leading from the other of said control valves to the other of said reversible hydraulic driving motors, each of said control valves having means for supplying fluid to either of its associated alternatively fluid supply and exhaust connections or to interconnect the latter while precluding fluid supply to either of them.

2. In combination, a pair of ground-engaging vehicle-supporting and propelling elements, a reversible hydraulic driving motor individual to one of said elements, a reversible hydraulic driving motor individual to the other of said elements, a power operated pump, a flow divider comprising a pair of motor-pump devices each having a fluid discharge and connected for rotation together, fluid supply connections between said pump and said pair of motor-pump devices comprised by said flow divider, a fluid supply connection leading from one of said fluid discharges, a fluid supply connection leading from the other of said discharges, a control valve to which one of said fluid supply connections leads, a control valve to which the other of said fluid supply connections leads, a pair of alternatively fluid supply and fluid exhaust connections leading from one of said control valves to one of said reversible hydraulic driving motors and a pair of alternatively fluid supply and exhaust connections leading from the other of said control valves to the other of said reversible hydraulic driving motors, each of said control valves having means for supplying fluid to either of its associated alternatively fluid supply and exhaust connections, for interrupting supply to both at once while blanking them off and for interrupting supply to both at once and placing them in communication with each other while cut off from fluid supply.

3. In combination, a power operated pump, a pair of rotary motor-pump devices connected for rotation together, means for delivering fluid from said power operated pump to said motor-pump devices concurrently, a motor, another motor, a connection for delivering fluid from one of said motor-pump devices to one of said motors, a connection for delivering fluid from the other of said motor-pump devices to the other of said motors, a source of hydraulic fluid with which said power operated pump is connected for the taking of fluid therefrom, and means associated with each of said connections for controlling the flow of fluid therethrough from the motor-pump device with which such connection is associated to the motor with which such connection is associated and for at will connecting such connection for fluid flow therefrom to the source.

4. In combination, a power operated pump, a pair of rotary motor-pump devices connected for rotation together, means for delivering fluid from said power operated pump to said motor-pump devices concurrently, a reversible motor, another reversible motor, a connection for delivering fluid from one of said motor-pump devices for delivery to one of said reversible motors, a connection for delivering fluid from the other of said motor-pump devices for delivery to the other of said reversible motors, a source of hydraulic fluid with which said power operated pump is connected for the taking of fluid therefrom, and means associated with each of said connections for controlling the flow of fluid therethrough from the motor-pump device with which such connection is associated to effect operation in one direction or the other of the reversible motor with which such connection is associated and for at will connecting such connection, in at least substantially free communication, with the source.

5. In combination, a power operated pump, a pair of rotary motor-pump devices connected for rotation together, means for delivering fluid from said power operated pump to said motor-pump devices concurrently, a reversible motor, another reversible motor, a connection for delivering fluid from one of said motor-pump devices for delivery to one of said reversible motors, a connection for delivering fluid from the other of said motor-pump devices for delivery to the other of said reversible motors, a source of hydraulic fluid with which said power operated pump is connected for the taking of fluid therefrom, and means associated with each of said connections for distributing the fluid flowing therethrough from the motor-pump device with which such connection is associated to effect operation in one direction or the other of the reversible motor with which such connection is associated, and for effecting locking of such motor while venting fluid from such connection to the source.

6. In combination, a power operated pump, a pair of rotary motor-pump devices connected for rotation together, means for delivering fluid from said power operated pump to said motor-pump devices concurrently, a reversible motor, another reversible motor, a connection for delivering fluid from one of said motor-pump devices for delivery to one of said reversible motors, a connection for delivering fluid from the other of said motor-pump devices for delivery to the other of said reversible motors, a source of hydraulic fluid with which said power operated pump is connected for the taking of fluid therefrom, and means associated with each of said connections for controlling the flow of fluid therethrough from the motor-pump device with which such connection is associated to effect operation in one direction or the other or locking against rotation or freeing for rotation in either direction of the reversible motor with which such connection is associated and for venting fluid from such connection to the source both when said motor is locked or freely rotatable.

References Cited in the file of this patent

UNITED STATES PATENTS

| 832,518 | Wolcott | Oct. 2, 1906 |
| 1,099,161 | Brown | June 9, 1914 |
| 2,393,324 | Joy | Jan. 22, 1946 |
| 2,431,719 | Wilkin | Dec. 2, 1947 |
| 2,641,070 | Bennett | June 9, 1953 |

FOREIGN PATENTS

| 973,478 | France | Sept. 13, 1950 |